UNITED STATES PATENT OFFICE.

FERNAND VAN DER STRAETEN, OF BRUSSELS, BELGIUM.

VEHICLE-BRAKE.

1,129,249.  Specification of Letters Patent.  Patented Feb. 23, 1915.

Application filed February 10, 1913. Serial No. 747,563.

*To all whom it may concern:*

Be it known that I, FERNAND VAN DER STRAETEN, a subject of the King of Belgium, residing at Brussels, in the Kingdom of Belgium, have invented certain new and useful Improvements in Vehicle-Brakes, of which the following is a specification.

This invention relates to car brakes for four wheel vehicles or vehicles which are mounted upon bogies, and more particularly to a brake mechanism for tramway cars.

The invention furthermore relates to brakes of the kind in which the brake mechanism for each pair of wheels comprises a pair of brake block holders rigidly connected together by a transverse bar having a pair of inwardly projecting brake levers pivoted at the ends of the cross bar and connected together by a more or less centrally arranged link, two of such mechanisms being arranged one at each end of the bogie frame the brake operating levers being mutually connected by rods pivoted adjacent the fulcrums of the said brake levers, whereby when one of the latter is actuated by the operating rod from either end of the bogie all four of the brakes are simultaneously applied to the wheels.

It is one of the objects of the present invention to provide a brake mechanism of the kind above referred to in which the strain upon the pivots of the inwardly directed brake levers will be relieved and taken up by the transverse bar when the brake rod at the opposite end is operated.

It is a further object of the present invention to provide in a brake mechanism of the kind referred to means for producing a perfectly uniform wear over the surface of the brake blocks or shoes.

According to the present invention the brake levers pivoted to the transverse bar connecting the brake block holders are provided with stops or abutments adjacent the pivots of the connecting rods said stops on each pair of levers being adapted when the brakes are operated from the other end of the bogie to engage the transverse bar connecting the brake shoes in such a manner that the strain is taken off the pivots thereof.

The transverse bars carrying the brakes and the operating levers are suspended from the frame by swinging members; each of the transverse bars being provided at about the center with a rigidly secured arm the outer end of which is suspended by a chain depending from the bogie frame, while the brakes at each side are suspended upon pivoted depending links, which links are preferably inclined in such a manner that the weight of the brakes will tend to retract them from the wheels. Owing to this latter arrangement comparatively weak retracting springs may be used and the brakes can be applied with greater ease by the operator.

Figure 1:
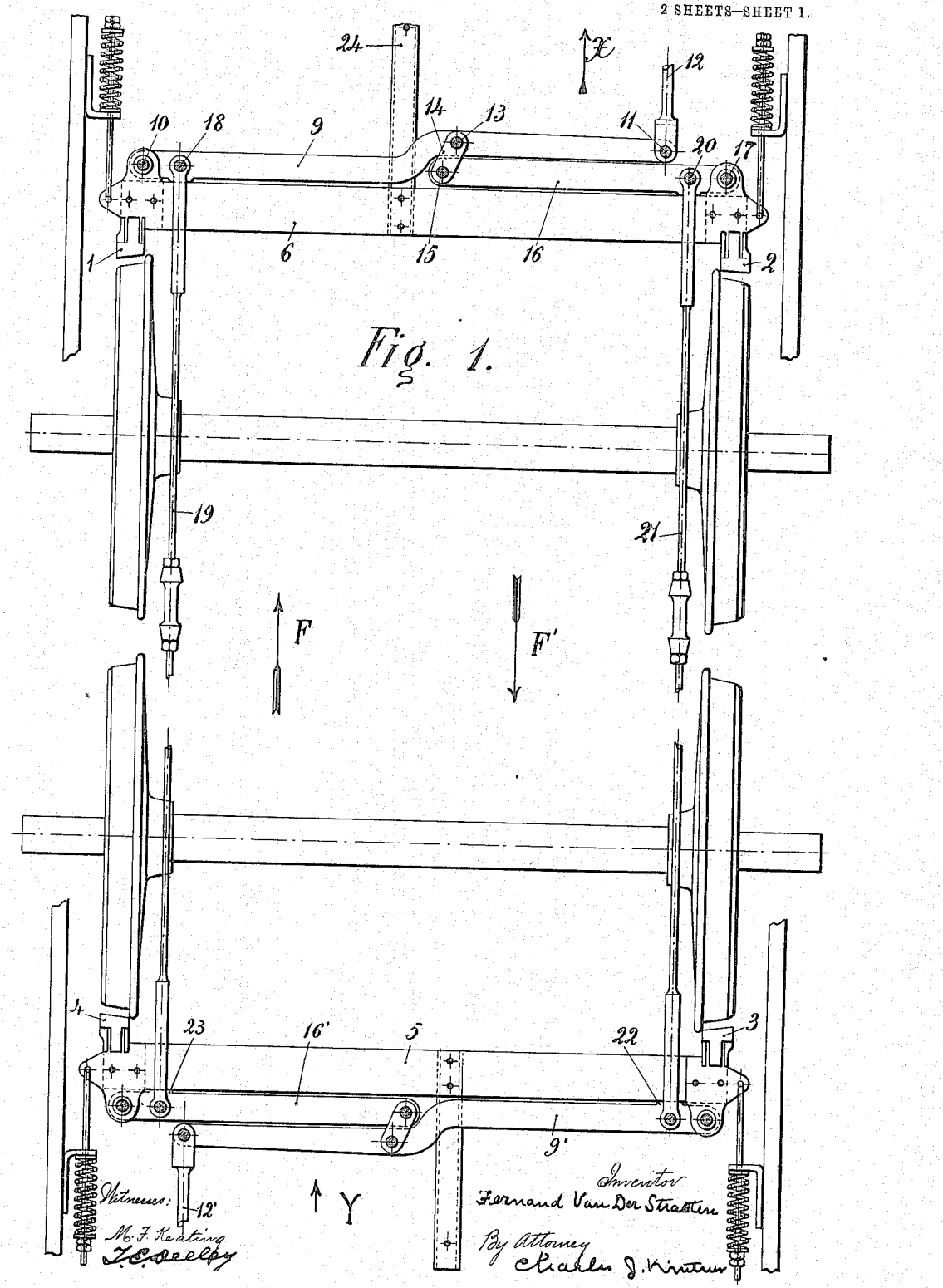
Figure 2:
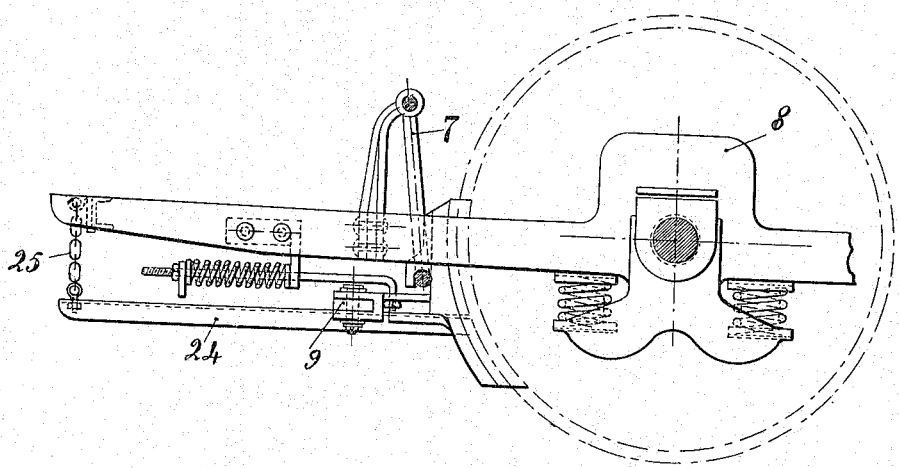

In the accompanying drawings; Figure 1 is a plan of the improved brake mechanism, certain parts being removed for the sake of convenience. Fig. 2 is a side elevation of one end of the bogie.

As the brake mechanisms for each pair of wheels are similar it will only be necessary to describe the mechanism mounted at one end of the bogie frame completely.

The brake blocks 1 and 2 are fixed to the transverse bar 6 suspended at each side by the links 7 to the frame 8 of the vehicle. At the extremity 10 of this bar 6 an inwardly projecting lever 9 is pivoted at 11 this lever is connected with the brake operating rod 12. In proximity to the axis of the vehicle at 13 a link 14 is pivoted, its other end 15 being pivoted to another inwardly directed lever 16 pivoted at 17 to the other extremity of the bar 6 carrying the brake blocks. The bar 6 is provided with a rigidly secured arm 24 suspended from the frame 8 by a chain 26. The links 7 are so arranged that the weight of the mechanism tends to retract the brakes from the wheels. Each pair of wheels is provided with a mechanism similar to that just described in which the parts 3, 4, 9′, 16′, 24′ and 12′ correspond to the parts 1, 2, 9, 16, 24 and 12 respectively and these two mechanisms are mutually connected by rods 19 and 21 pivotally connected to the levers 9, 16, 9′ and 16′ at points adjacent their fulcrums. Upon the levers 9, 16 and 9′, 16′ stops are provided corresponding to those designated by the numerals 22 and 23.

The device acts in the following manner: When the lever 9, for example, is actuated by the operating rod 12 in the direction indicated by the arrow X it is obvious that, by the intermediary of the link 14 it operates the lever 16 in the same direction; the points 10 and 17 are displaced in the direction F′ and the bar 6 applies the blocks 1 and 2 against the corresponding wheels. The movement of the levers 9 and 10 serves to displace the rods 19 and 21 in the direction F. These rods move the levers 9' and 16' about their pivots in the direction indicated by the arrow Y and apply the bosses 22 and 23, with which they are provided, against the bar 5, which, being thus displaced in the direction indicated by the arrow F, applies its blocks 3 and 4 against the corresponding wheels. Naturally the same actions are reproduced in the inversed direction when the lever 16' is actuated by the operating rod 12'.

It should be noted that each brake mechanism is suspended at three different points, which affords great advantages.

What I claim and desire to secure by Letters Patent of the United States is:—

1. In a car brake mechanism of the kind described the combination with a pair of transverse bars having rigidly fixed brake block holders at each end, of a pair of brake operating levers pivoted to each of the transverse bars adjacent the brakes, a pair of rods mutually connecting the pair of brake operating levers, an inwardly projecting stop on each of the brake operating levers adjacent the pivots of the connecting rods, and swinging members for supporting the brake mechanisms from the frame.

2. In a car brake mechanism of the kind described the combination with a pair of transverse bars having rigidly fixed brake blocks at each end of a pair of brake operating levers pivoted to each of the said transverse bars adjacent the brakes, a pair of rods mutually connecting the pairs of brake operating levers, an inwardly projecting stop on each of the brake operating levers adjacent the pivots of the connecting rods, an arm projecting from each of the said transverse brake bars, a depending chain connected to the end of each arm, and to the frame and a pair of links connected to the frame and to the brakes.

3. In a car brake mechanism of the kind described the combination with a pair of transverse bars having rigidly fixed brake block holders at each end of a pair of brake operating levers pivoted to each of the transverse bars adjacent the brakes, a pair of rods mutually connecting the pairs of brake operating levers, an inwardly projecting stop on each of the brake operating levers adjacent the pivots of the connecting rods an arm projecting from each of the said transverse brake bars, a depending chain connected to the end of each arm and to the frame and a pair of links pivoted to the frame and to the brakes, the links being inclined from their points of support toward the wheels.

In testimony whereof I affix my signature in presence of two witnesses.

FERNAND VAN DER STRAETEN.

Witnesses:
PAUL PHILIPPARD,
CHAS. ROY NASMITH.

Copies of this patent may be obtained for five cents each, by addressing the "Commissioner of Patents, Washington, D. C."